J. HOOPES.
Car Truck.
No. 35,024.
Patented Apr. 22, 1862.
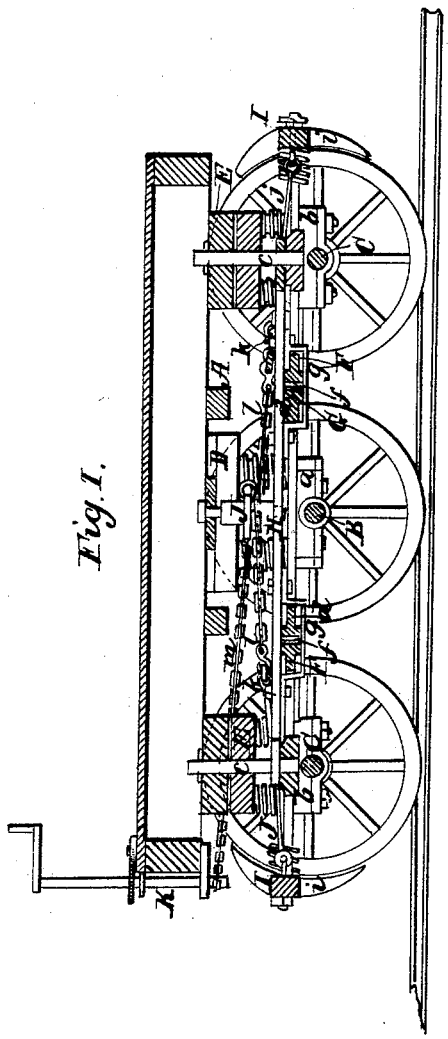
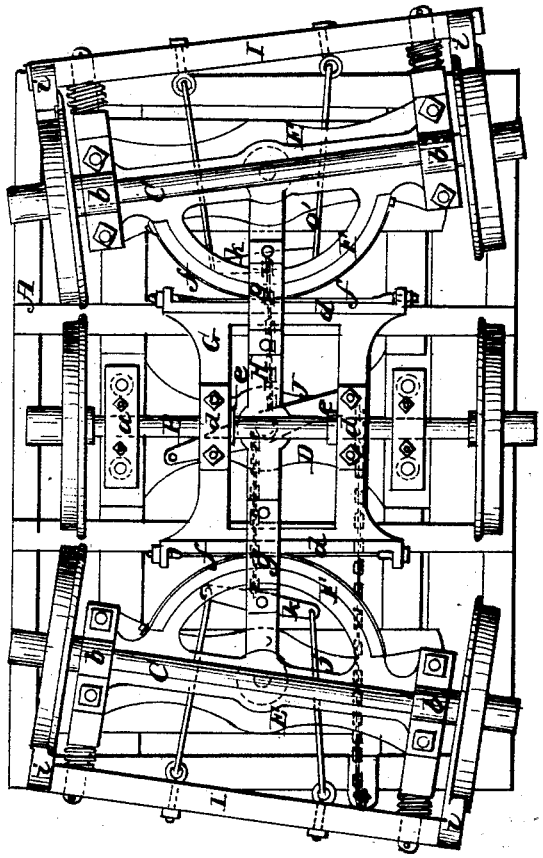
Witnesses
Inventor:

UNITED STATES PATENT OFFICE.

JASPER HOOPES, OF PHILADELPHIA, PENNSYLVANIA.

IMPROVED CAR-TRUCKS.

Specification forming part of Letters Patent No. 35,024, dated April 22, 1862.

*To all whom it may concern:*

Be it known that I, JASPER HOOPES, of Philadelphia, in the county of Philadelphia and State of Pennsylvania, have invented a new and useful Improvement in Railroad-Car Trucks; and I do hereby declare that the following is a full, clear, and exact description of the same, reference being had to the annexed drawings, making a part of this specification, in which—

Figure 1 is a side sectional view of my invention; Fig. 2, an inverted plan of the same.

Similar letters of reference indicate corresponding parts in the two figures.

This invention has for its object the constructing of the car-truck in such a manner as to facilitate the turning of curves on the line of the road on which the truck runs, and thereby avoid the wear and tear of both the rails and the running-gear of the truck consequent on the construction of the trucks in general use.

To enable those skilled in the art to fully understand and construct my invention, I will proceed to describe it.

A represents a car-truck, which is of rectangular form, properly framed, and connected to the car-bed by a king-bolt.

B C C are three axles secured to the truck A, the axles C C being near each end and the axle B at the center. The central axle, B, has its bearings *a* attached to a plate, D, which is rigidly secured to the truck, while the axles C C have their bearings *b b* attached to plates E E, which work or turn freely on bolts *c c*, attached to the truck A.

The inner sides of the plates E E have semicircular projections F, formed on or cast with them.

The central axle, B, is allowed to slide in its bearings longitudinally, and to the axle B a frame, G, is attached, said frame having parallel ends, *d d*, which are opposite the semicircular projections F of the plates E E. The frame G is attached to the axle B by bearings *d*, in which the axle B turns freely, and on the axle B, at the inner sides of the bearings, there are shoulders *e e*, which cause the frame G and axle B to move simultaneously. The ends *d d* of the frame G are attached to the semicircular projections F by metal bands *f f*, which cross each other and insure a simultaneous movement of the axles B C C. The ends *d d* of the frame G, and also the semicircular projections F, work in guides *g* on a bar, H, which is in line with the bolts *c c*, on which the plates E E turn.

From the above description it will be seen that as the axles C C are turned the central axle, B, will be moved longitudinally in its bearings, so that the three wheels *h* at each side of the truck will be in the paths of concentric circles with which their axle B C C are radii, and the axles and wheels will conform to curves of greater or less radii.

I do not confine myself to the metal bands *f f* for forming a connection between the ends *d d* of the frame G and the projections F F, for other means may be employed. This arrangement of the axles involves the necessity of a peculiar brake or a modification of the one in general use. The brake-bars I I, instead of being suspended from the truck, as hitherto, are connected to the plates E, in order that a proper relative position of the wheels and the shoes *i* of the brake-bars may be always preserved. The brake-bars I I are connected by rods *j*, bars *k*, and chains *l l*, which are attached to a lever, J, at the center of the truck, the lever J being connected at its outer end to the usual hand-rod, K, by a chain, *m*.

Having thus described my invention, what I claim as new, and desire to secure by Letters Patent, is—

The combination of the plates E E, semicircular projections F F, frame G, bands *f*, bar H, and guides *g*, with the axles B C C, in the manner and for the purpose herein shown and described.

JASPER HOOPES.

Witnesses:
S. S. TOWNSEND,
J. MADISON HIBBY.